(12) United States Patent
Hashimoto et al.

(10) Patent No.: US 12,224,932 B2
(45) Date of Patent: *Feb. 11, 2025

(54) DISCOVERY AND ROUTING SERVICE FOR A CLOUD INFRASTRUCTURE

(71) Applicant: HashiCorp, San Francisco, CA (US)

(72) Inventors: Mitchell Hashimoto, Los Angeles, CA (US); Evan Phoenix, Los Angeles, CA (US)

(73) Assignee: HashiCorp, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,416

(22) Filed: Sep. 7, 2023

(65) Prior Publication Data
US 2023/0421489 A1    Dec. 28, 2023

Related U.S. Application Data

(63) Continuation of application No. 17/575,508, filed on Jan. 13, 2022, now Pat. No. 11,792,120.

(51) Int. Cl.
*H04L 45/42* (2022.01)
*H04L 9/40* (2022.01)
*H04L 45/00* (2022.01)
*H04L 45/24* (2022.01)

(52) U.S. Cl.
CPC .............. *H04L 45/42* (2013.01); *H04L 45/24* (2013.01); *H04L 45/38* (2013.01); *H04L 63/166* (2013.01)

(58) Field of Classification Search
CPC ......... H04L 45/24; H04L 45/38; H04L 45/42; H04L 63/166
See application file for complete search history.

(56) References Cited

U.S. PATENT DOCUMENTS

| | | | |
|---|---|---|---|
| 11,089,115 B2 | 8/2021 | Garty et al. | |
| 2022/0116445 A1 | 4/2022 | Filippou et al. | |
| 2022/0158912 A1 | 5/2022 | Ikäheimo | |
| 2022/0158926 A1 | 5/2022 | Wennerstrom et al. | |

*Primary Examiner* — George C Neurauter, Jr.
(74) *Attorney, Agent, or Firm* — FisherBroyles LLP; James P. Cleary

(57) ABSTRACT

A discovery and routing service may generate a URL related to an application to be deployed to a cloud computing platforms, the URL providing access to an edge list containing one or more edge nodes. The discovery and routing service may connect at least one agent to the URL. The discovery and routing service may send authentication information to the agent, including an identifier related to the agent, and a set of agent labels. The discovery and routing service may insert, after authentication by the edge node, the authentication information into a routing mesh. The discovery and routing service may locate the agent, in response to a request, based on a comparison between the set of request labels and a set of agent labels. The discovery and routing service may connect the located agent with traffic to and from the routing mesh.

20 Claims, 6 Drawing Sheets

```
400
project = "project-name"

app "app-name" {
    path = "./src"

build {
        # ...
    }                        ← 402 deploy {
        # ...
    }                        ← 404 release {
        # ...
    }                        ← 406 plugin "plugin-name" {
    }
}
```

FIG. 4

```
project = "my-project"

app "wp-react" {
    path = "./src"

build {
        use "pack" {
        }
        registry {
            use "docker" {
                image = "waypoint/demojs"
            }
        }
    } deploy {
        use "kubernetes" {
            probe_path = "/"
        }
    } release {
        use "kubernetes" {
            load_balancer = true
            port = 80
        }
    }
}
```

FIG. 5

```
project = "example-java"

app "example-java" {
    build {
        use "pack" {
            builder="paketobuildpacks/builder:base"
        }
    }
    deploy {
        use "docker" {
            service_port=8080
        }
    }
}
```

FIG. 6

```
» Building...
 √ Creating pack client
 √ Building image
 √ Injecting entrypoint binary to image Generated new Docker image: example-nodejs:latest » Deploying...
 √ Setting up waypoint network
 √ Starting container
 •: App deployed as container: example-nodejs-01EMM4TEN9SCXXE9O0F4EFQ9NR » Releasing...

The deploy was successful! A Waypoint deployment URL is shown below. This
can be used internally to check your deployment and is not meant for external
traffic. You can manage this hostname using "waypoint hostname."

Release URL: http://192.168.1.79

Deployment URL: https://instantly-worthy-shrew--v1.waypoint.run
```

FIG. 7

DISCOVERY AND ROUTING SERVICE FOR A CLOUD INFRASTRUCTURE

TECHNICAL FIELD

The subject matter described herein relates cloud computing infrastructure, and more particularly to a workflow tool that uses a single configuration file to build, deploy and release applications across one or more cloud computing platforms.

BACKGROUND

Virtually all software applications, i.e. computer programs that are designed an written to fulfill a particular purpose or perform a particular function, have a similar lifecycle. As shown in FIG. 1, this lifecycle includes largely sequential phases of coding, testing, building, deploying, releasing, and then operating and measuring the application code. Each of these phases has distinct patterns, and can be performed using one or more well-established but phase-specific tools.

For instance, the coding and testing phases for application development typically occur within a development environment that is separate from the eventual operational infrastructure on or within which the application will be operated. The coding phase can include the use of conventional and well-known code editing tools such as Visual Studio®, while for the testing phase a development team can use a CI environment such as Circle™ and/or post the code to a code management and version control hosting platform such as Github™.

Similarly, at the opposite end of the software lifecycle in the operate and measure phases, and in particular for cloud-based applications running on cloud or multi-cloud infrastructure, tools such as Terraform®, Kubernetes®, Nomad®, Datadog®, etc. are commonly used for hosting, operating and measuring application code, no matter which specific cloud infrastructure is used or targeted for use.

However, in the build, deploy, and release phases of the application development lifecycle, things are much more complicated. For instance, the build phase exhibits a lack of standardization between application development tools, especially for cloud-based implementations. The deploy phase is presently a fragmented mix of scripts, integration tools, and product "handoffs," i.e. the collaborative work between development and operation teams. The release phase currently requires domain-specific skills that do not translate well across or between cloud platforms, as each platform has its own unique and often proprietary operating parameters, communication protocols, maintenance and version control procedures, etc. Accordingly, these three "middle" phases of the software development and deployment lifecycle are very complex and the workflow through them is difficult to manage, particularly in a multi-cloud operating environment.

Developers want a better interface to the build, deploy and release phases. Currently, developers might utilize makefiles, i.e., a file that defines a set of tasks to be executed. However, makefiles (or "maketasks") are very difficult to scale, and there is limited common or shared knowledge around this practice. Another option is to use continuous integration/continuous deployment (CI/CD) pipelines to hide the software behind an interface, such as a "git push" or by clicking a button in the CI user interface (UI). But, like makefiles, this solution tends to be very organization-specific and very fragmented between different CI environments and their respective integration and deployment tools. Yet another option currently being used is a Platform as a Service (PaaS), which provides a clean path to get an application to production. But, any action or communication that extends beyond the platform will tend to break down or become overly complicated.

The quintessential workflow in any development tool is to run the tool and generate a functional uniform resource locator (URL). Unfortunately, obtaining a functional URL is challenging on most platforms and URL generation is not consistent across different platforms. For instance, a container-based application deployment system such as Kubernetes provides the notion of an ingress or LoadBalancer service type to generate a URL. Many platforms, such as Nomad, ECS, and Lambda require additional resources for a routable URL. In addition to resource requirements, there are usually routablility requirements, such as being on a public subnet. Ultimately, generating a routable URL is a complex and disjointed user experience.

Accordingly, there remain many challenges to getting an application from code into a deployment platform, despite a large and growing array of choices for such deployment. What is needed is a workflow tool to build, deploy and release applications for deployment to one or more cloud computing platforms.

SUMMARY

This document describes a workflow tool to build, deploy and release application code of an application to any of one or more cloud computing platforms. The workflow tool includes, or is implemented by, a first processor, configured to generate a single configuration file for the application. The first processor can be one or more individual processors or a virtual processor. The single configuration file includes, with a common command-line interface (CLI) language, a build configuration defining a build tool used for building the application, a deploy configuration defining a cloud computing platform to which the application will be deployed, and a release configuration defining logic for releasing the application to one or more users of the cloud computing platform. The workflow tool further includes a release uniform resource locator (URL) generated by the first processor, the release URL providing access, by the cloud computing platform to the one or more users, to the application upon the releasing.

In one aspect, As part of the workflow tool, a discovery and routing service can be provide a consistent release URL across one or more cloud computing services. Deploying the release URL includes providing a URL that provides access to an edge list containing one or more edge nodes. Agents accessing the URL are provided with a connection to one or more edge nodes from the edge list. Once an agent accesses the URL, the agent is sent authentication information, including a unique agent identifier and a set of agent labels. Agent labels identify traffic between the agent and each of the edge nodes. Once the agent is identified and authenticated by the discovery and routing service, the authentication information is inserted into a routing mesh. The routing mesh is configured to send traffic to the agent in response to a request that includes a set of request labels. Once a request is received, the discovery and routing service locates the agent by comparing the request labels to the agent labels. A set of request labels is authenticated when there is a one-to-one match between at least one label in both the set of request labels and the set of agent labels. After the agent is located the discovery and routing service connects the agent with traffic to and from the routing mesh.

In some variations one or more of the following features can optionally be included in any feasible combination. Traffic between the located agent and the routing mesh can be terminated by the discovery and routing service upon the receipt of a Transport Layer Security (TLS) request. Additionally, terminating the request based on a TLS request can further include providing connection information that allows the agent to respond to the request. In other variations, a set of request labels can be authenticated if each label in a set of agent labels matches each label in a set of request labels. In some implementations, the request label can be authenticated regardless of whether the agent labels and request labels are in the same order. In other implementations, the edge nodes can have public addresses and can be directly addressable. The discovery and routing service can also be configured automatically using a custom entrypoint binary (CEB). The CEB can be configured to send information about the application to the discovery and routing service. Once this information is received, the discovery and routing service can use the information to select configuration settings.

Implementations of the current subject matter can include, but are not limited to, methods consistent with the descriptions provided herein as well as articles that comprise one or more tangibly embodied machine-readable mediums operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a workflow tool to build, deploy and release applications to one or more cloud computing platforms, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows a single configuration file that defines a consistent workflow for the build, deploy and release phases for an application deployment to a cloud platform.

FIG. 5 shows the single configuration file employing a Docker® build and a Kubernetes® deployment and release.

FIG. 6 shows a build and deploy configuration using a Buildpacks implementation;

FIG. 7 illustrates an output example when the workflow tool is run, showing the build, the output as part of that, the deploy happening, and then a release at the end including a release URL and a deployment URL.

When practical, similar reference numbers denote similar structures, features, or elements.

DETAILED DESCRIPTION

This document describes a workflow tool to build, deploy and release application code of an application to any of one or more computing platforms, especially cloud computing platforms given a wide variety of cloud computing platforms that now run applications. The term "platform" refers to herein as any computing platform on which an application can run. The workflow tool described herein provides a consistent workflow to build, deploy, and release applications on any platform. In some implementations, the workflow tool is defined in a single command that encapsulates the build, deploy, and release phases to get an application from development into production.

In preferred exemplary implementations, within an application development environment, each project can have an associated configuration file. The configuration file defines each of the build, deploy and release phases, and further respectively defines and specifies the specific tool used for the build, the operation platform for which the application is intended, and the logic desired to release the to the public via the operation platform. These aspects and features are described in more detail below.

Figure 1:
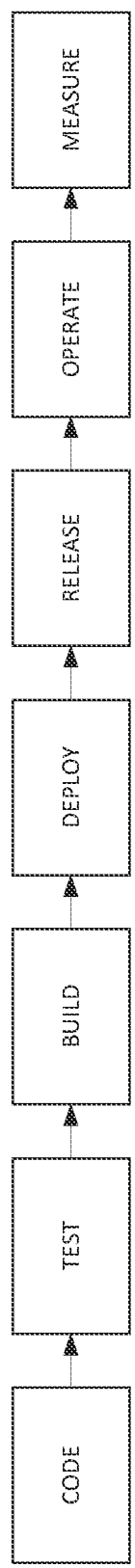
FIG. 1 illustrates a software application lifecycle from development to deployment.
Figure 2:
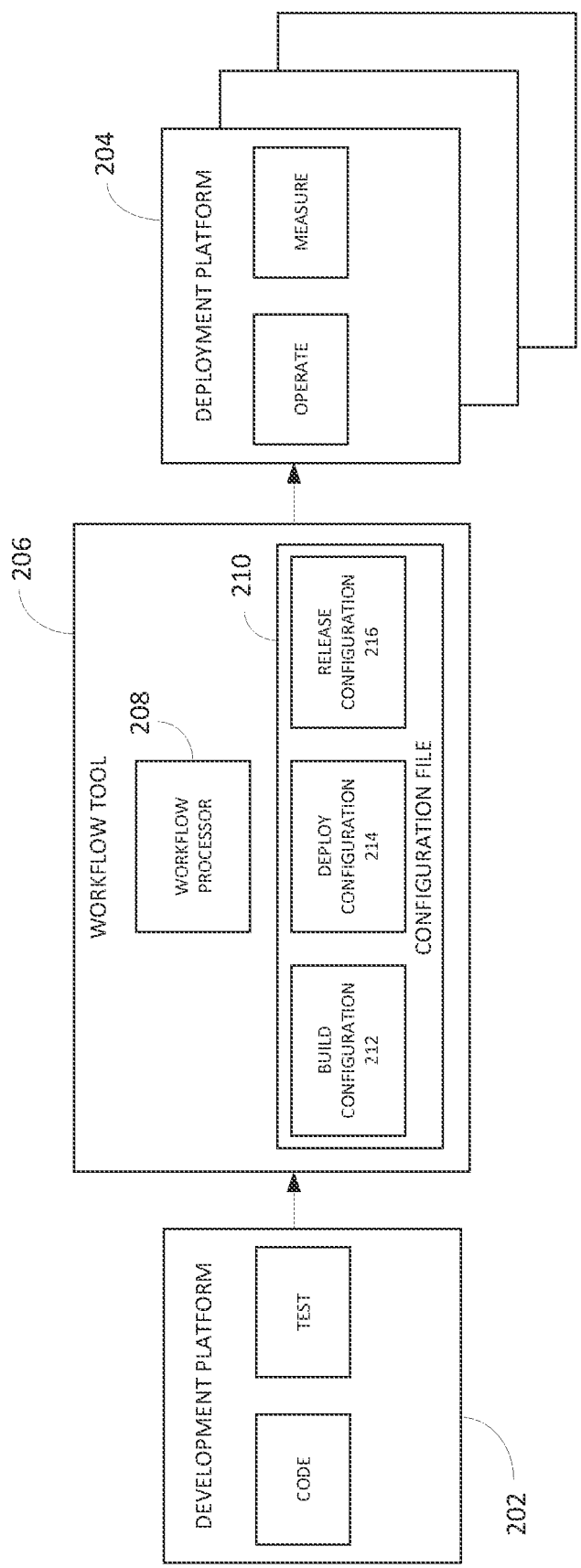
FIG. 2 is a diagram illustrating aspects of a system including a workflow tool, showing features consistent with implementations of the current subject matter.

In implementations consistent with the details described herein, and as illustrated in FIG. 2, a workflow tool 206 is provided to manage and execute the build, deploy and release phases of application deployment, between a development platform 202 (in which coding and testing take place) and a deployment platform 204 (to which an application is deployed to be operated and measured). The workflow tool 206 includes a first processor (workflow processor 208) that is configured to generate a single configuration file 210 for the application. The single configuration file 210 can be generated using a common command-line interface (CLI) language, such as HashiCorp Configuration Language (HCL). HCL is a configuration language built by HashiCorp® that uses human-readable text but is structured to be machine friendly for use with command-line tools, is JavaScript Object Notation (JSON) compatible, an can also accommodates comments.

The single configuration file 210 includes a build configuration 212 that defines a build tool used for building the application, a deploy configuration 214 defining the deployment platform 204 to which the application will be deployed, and a release configuration 216 defining logic for releasing the application to the intended deployment platform 204 for use by one or more users. The first processor 208 is further configured to generate a release uniform resource locator (URL) to provide access, by the deployment platform 204 to the one or more users, to the application upon the releasing.

Configuration File

Each of the build, deploy and release configurations for a project and associated application are integrated into a single configuration file 400, as illustrated in FIG. 4. In this example, a build configuration 402, a deploy configuration 404, and a release configuration 406 define the build phase, the deploy phase, and the release phase, respectively, of the application lifecycle for the application and project. By having these three configurations 402, 404, 406 in one configuration file 400, it can be referenced by a user to know the full logic and lifecycle of how that application gets to production. Thus, while the workflow tool 206 does not replace tools such as container-orchestration systems for application deployment to a cloud platform, like Kubernetes®, Helm®, or Docker®, it is configured to wrap these and other tools in the single configuration file 400, provide them together in a proper order for successful application deployment, and provide a consistent workflow on top of them.

The build configuration 402 takes application source code and uses a build process or tool to convert the application code to an artifact. An artifact is a packaged form of an application required on a target platform: a container image, virtual machine image, even a simple ZIP file, or the like, for example. The build process may also include an optional "push" operation to push the built artifact to a registry so that is available for the deployment platform. For instance, the workflow tool can include a set of built-in plug-ins for tools to build a container or image for an application, such as Docker Build (see FIG. 5), Docker Pull Build, and Cloud Native Buildpacks, etc., or the like (see FIG. 6).

In one exemplary implementation, as shown in FIG. 5, configuration file for a project "my-project" uses Cloud Native Buildpacks for the build component, and Docker as a registry from the build process. Kubernetes native systems are used for the deployment component as well as the release component. Accordingly, the Kubernetes service primitives are used to point to the correct deployment for the public to see, but in a consistent workflow defined by the single configuration file.

FIG. 7 shows an exemplary output when the workflow tool is run, showing the build, the output as part of that, the deploy happening, and then a release at the end. As shown in FIG. 7 with the release, a release URL is provided. The release URL is the public URL provided by the release platform by which users can access this application. This is provided by the platform.

Further, a deployment URL is generated. The deployment URL has a specific domain, in this example a waypoint.run domain named after a name of the workflow tool. This domain uses an service that is run, separate from the workflow tool, to provide routable URLs for all deployments. This can be an optional service, but which can provide a URL to every application built, irrespective of the platform it is on, and it is consistent. Accordingly, the workflow tool described herein works with any application code and with any platform. It does not matter what programming language is used, or which platform the application is being deployed to, the workflow tool provides a consistent workflow, URL output, and deployment URLs.

Validating Deployments

Figure 3:
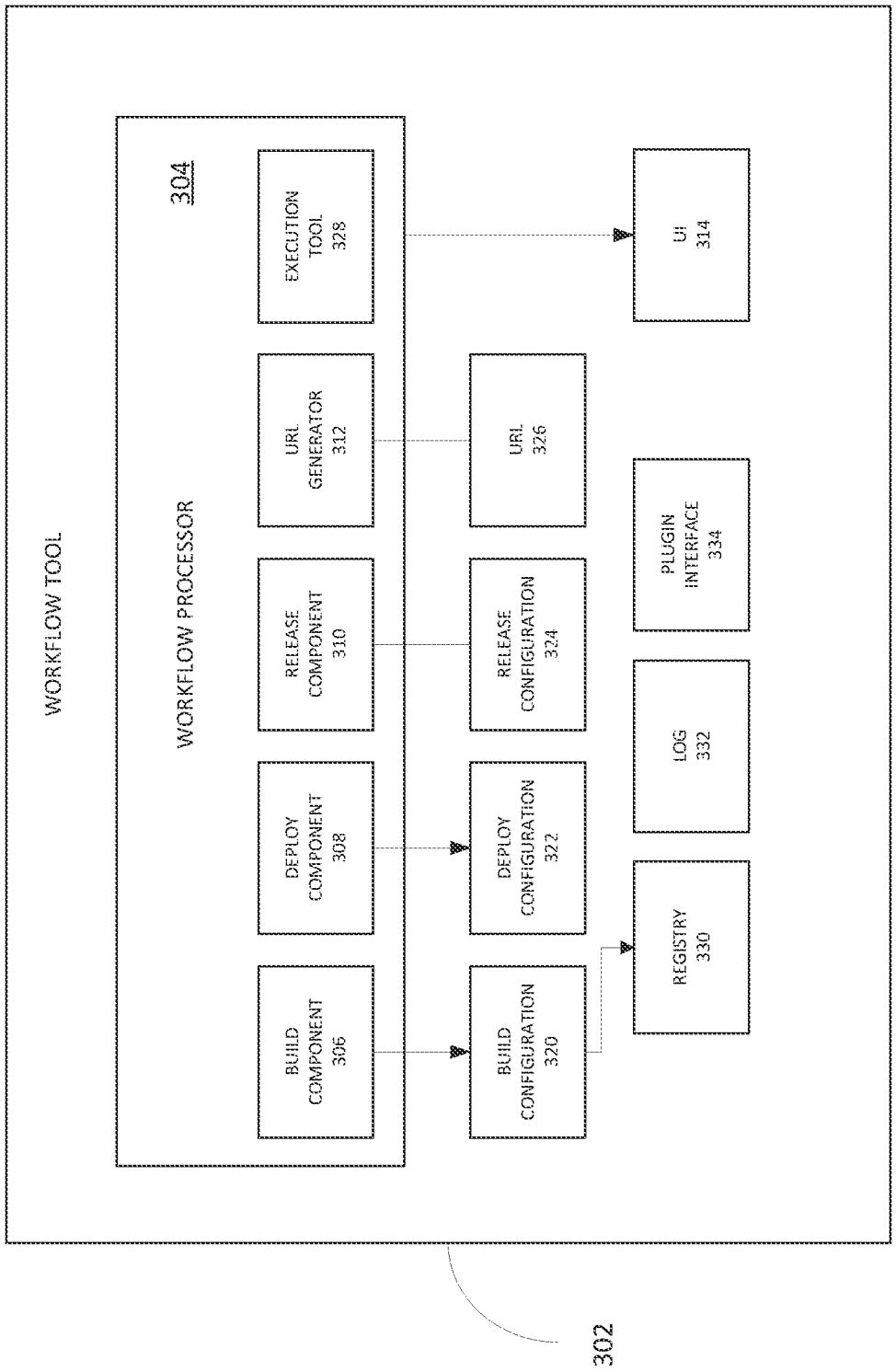
FIG. 3 is a block diagram illustrating aspects of a workflow tool according to various implementations of the current subject matter.

Once the workflow tool is run, i.e. the built application is deployed, the next aspect is to be able to tell whether the application is running, regardless of which deployment tool is used. In some cases, this step may entail opening up a URL in a UI, refreshing the URL a few times, or checking logs related to the deployment. While these steps can often work, for efficiency and greater validation, as shown in FIG. 3, a workflow tool 302 can include several integrated tools and features that allow a user to easily validate that an application deployment is working correctly. For instance, a build process of a build component 306 of the workflow processor 304 may also include an optional "push" operation to push the built artifact to a registry 330 so that is available for the deployment platform.

Discovery and Routing Service

In some implementations, the workflow tool includes a discovery and routing service. The discovery and routing service provides an externally routable URL across one or more cloud computing platforms. The discovery and routing service can optionally provide a domain name that identifies the discovery and routing service to increase customer awareness of the service. This additional service can be provided as a default service to the discovery and routing service, in some implementations.

Figure 8:
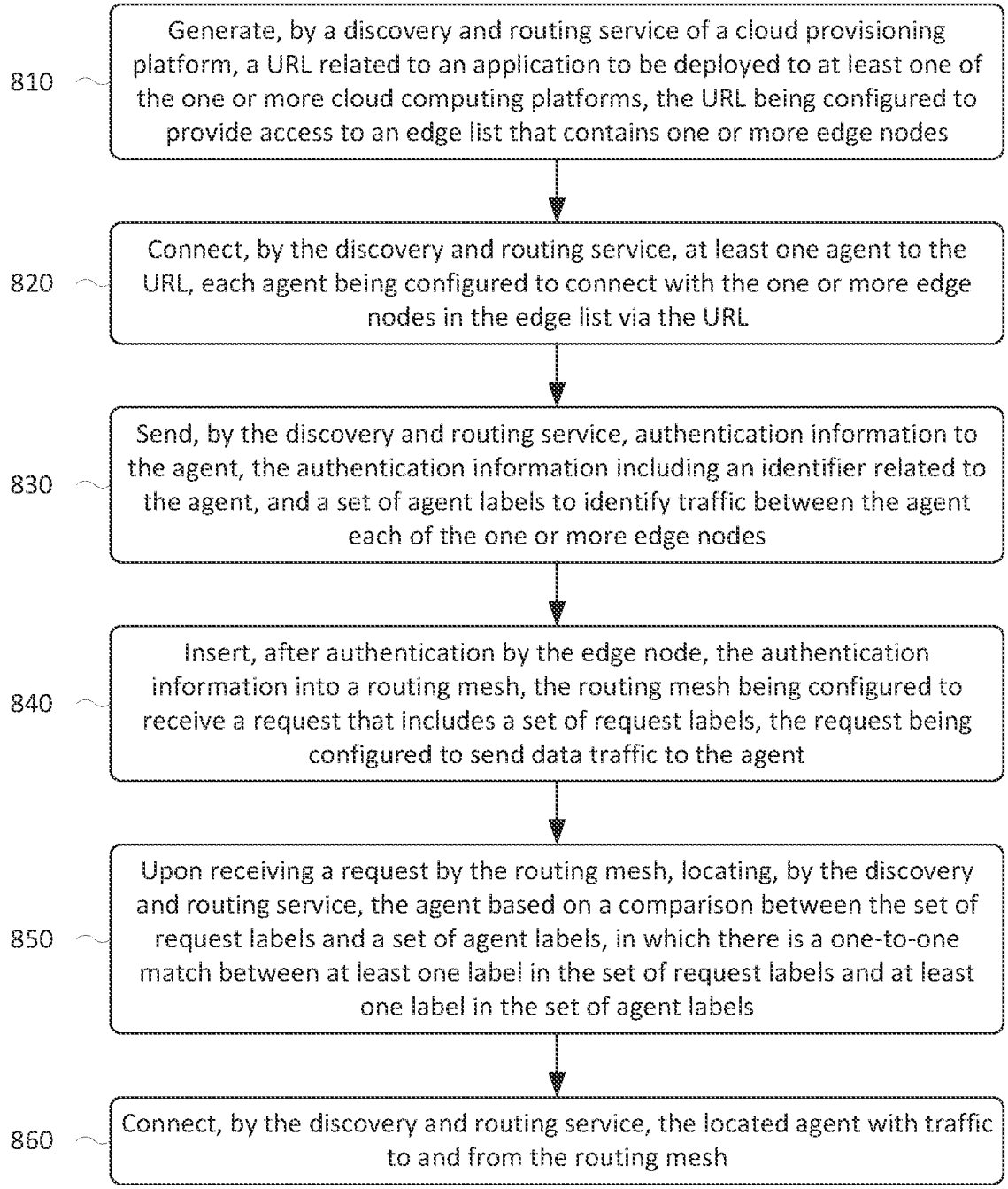
FIG. 8 is a block diagram illustrating aspects of a discovery and routing service according to various implementations of the current subject matter.

FIG. 8 illustrates a process 800 for generating a URL for an application in a routing and discovery service. As shown in FIG. 8, in block 810 the routing and discovery service X may generate a URL related to an application to be deployed to at least one of the one or more cloud computing platforms. The URL may be hosted by a service provided by the workflow tool or self-hosted by the user. The cloud computing platforms can include Microsoft Azure, Amazon Web Services (AWS), Oracle Cloud, etc. The URL is configured to provide access to an edge list that contains one or more edge nodes. As further shown in block 820 of FIG. 8, process 800 may include connecting at least one agent to the URL so that the agent can connect with one or more nodes in the edge list via the URL. An agent may include a system agent, a client agent, a web crawler, an intelligent agent, etc.

At block 830, the process 800 may include sending authentication information, including an identifier related to the agent and a set of agent labels to identify traffic between the agent and each of the one or more edge nodes. Authentication information can include a token corresponding to the account associated with the agent. Additionally, Agent labels can be both order and case independent. This independence means that a label "service=www" may be the same as "service=WWW" or "service=WwW" in some embodiments. When a routing mesh attempts to identify an agent in order to send traffic to that agent, the mesh may use the full set of agent labels to match the agent. For example, if a target criteria was "env=prod" and the agent had advertised "env=prod, service=www" the agent would not be matched.

As further shown in FIG. 8, at block 840, the authentication information may be inserted into the routing mesh after authentication. Examples of inserting into the routing mesh can include, for self-hosted applications, registering with the discovery and routing service itself, while, for cloud based applications, inserting into the routing mesh can involve writing a record into a global database.

Further, the routing mesh is configured to receive a request that includes one or more request labels, to send traffic to the agent. After receiving the request, the routing mesh can locate the agent based on a comparison between the request labels and the agent labels as shown in block 850. Block 860 shows that the routing and discovery service may include connecting the located agent with traffic to and from the routing mesh. The request is authenticated by the routing and discovery service, and the agent can be located, if a comparison between the agent labels and the request labels shows a one-to-one match between at least one label in each set of labels. Once a request has been mapped to a set of labels, the edge node may query the routing mesh database where the agent has registered itself.

The edge node may select one of a set of (edge-id, node-id, agent-id) tuples returned by the database in response to the query. The tuples may be selected at random or selected based on considerations such as account agent load or latency. Once a tuple is selected, the edge node may transmit the request to a given node. In some cases the given node may be itself so the request can be directly sent to the agent. In other cases, the edge node looks up the connection information from the routing mesh database and connects to a forwarding endpoint on the target node where requests are forwarded. If a previous connection exits, the existing connection may be used to speed the forwarding process. When the request is sent through multiple nodes, the one terminating the initial request may send connection information along with the termination request to the agent. By sharing the connection information with the agent, the agent may connect back to the edge node directly and transmit a response. In some implementations, there may be a limit on the total number of connections for each agent. Each edge node may be directly accessible through a public address which may allow other edge nodes or agents to directly connect to a specific edge.

Process 800 may include additional implementations, such as any single implementation or any combination of implementations described below and/or in connection with one or more other process described elsewhere. In a first implementation, process 800 may include terminating traffic to and from the routing mesh and the located agent based on a Transport Layer Security (TLS) request. The deployment and routing service may include a TLS-by-default approach.

Although FIG. 8 shows example blocks of process 800, in some implementations the process may include additional blocks, fewer blocks, different blocks, or differently arranged blocks than those depicted in FIG. 8. Additionally, two or more blocks of process 800 may be performed in parallel.

UI

As shown in FIG. 3, In some implementations, the workflow tool 302 can generate a UI 314. The UI 314 can include one or more graphical user interfaces rendered in a display connected with a workflow processor 304. The UI 314 is configured to display a build configuration 320, a deploy configuration 322, and a release configuration 324, URLs 326 (such as release URL and deployment URL), as well as a current status of each of these. The UI 314 provides an intuitive, interactive and efficient mechanism by which to verify that a deployment is complete. The UI 314 can be customizable and/or configurable to suit user preferences. For instance, the UI 314 can have a "dark mode" for nighttime or viewing the UI 314 in a darkened environment.

Execution Tool

In some implementations, the workflow tool further includes an execution tool 328 that can be used to open a shell or execute any process in the context of a deployment. In some implementations, the execution tool 328 is a tool that is provided on the command line, along with the build, deploy and release configurations 320, 322 and 324, respectively. The execution tool 328 provides access to any deployment, to allow a user to be able to ensure the application is properly deployed and running as intended. The execution tool 328 enables a user to execute commands in the context of a deployed application, and can be used to open up a shell for debugging, execute database migrations, and other application-specific functions. In some implementations, the execution tool 328 works by picking a random running instance of the latest deployment of the application, and executing within that environment.

The execution tool 328 works across any platform to which an application is to be deployed, despite similar functionality provided by each separate deployment tool, such as Kubernetes® or Google Cloud Run, or EC2 instances, etc. The execution tool 328 provides a similar experience across any deployment tool used, and therefore provides a consistent access to deployed application no matter which deployment is used, all without needed to exit the workflow tool and enter into a specific deployment tool's execution functionality.

Logs

In some implementations, another validation tool provided by the workflow tool 302 is a log 332, from which a user can see all the recent logs from each deployment of each application. As with the execution tool, the workflow tool logs work across every platform consistently, as well as with each deployment tool, and using a consistent workflow. In some cases, these logs 332 are not meant to replace long-term log storage or log searching, especially since most deployment tools include their own log functionality, but rather are configured to provide log access for a recent history of deployments, so as to enable a user to quickly see each deployment and/or to verify that each specific deployment is up and running as expected. These logs 332 further assist a user in being able to debug any issues that get logged during the deployment.

Extensibility

A key feature of the workflow tool, particularly for operating in a multi-cloud platform environment, is extensibility. Accordingly, in some implementations the workflow tool 302 includes a plugin interface 334, which enables the workflow to be flexible and work in any of a variety of present or future scenarios. For example, a common way to display applications is using practices such as Continuous Integration/Continuous Deployment (CI/CD), which is a standard practice in software engineering, especially when involving large development teams. In these scenarios, CI/CD is one preferred way to integrate the build-deploy-release cycle of the workflow. Accordingly, the workflow tool 302 can configured to be run directly within existing CI/CD platforms, such that deploying an application can be consistent across a variety of different places in a CI/CD environment.

Another example is a similar set of practices known as GitOps, or a Git-based workflow, which describes systems with declarative specifications that form the basis of continuous operations and tasks. Typically, a Git-based workflow includes a Git "push," which triggers a deployment either to production or to a preview state. To accommodate these practices, the workflow tool 302 can include one or more plugins to the plugin interface 334 for different control systems so that versioning and other operations can be directly integrated with Git workflows. With such GitHub integration, every branch will get a separate build-deploy-release component, and a deployment URL that is branch-specific, to allow a user to view any branch, get a preview of its deployment and how it is working, and then when it is merged into the main brand, the workflow tool will deploy it into production.

The workflow tool 302, via the plugin interface 334, is therefore extensible to these and other tools and practices for deploying applications, and which not only allows users to work in those deployment environments, but across multiple deployment environments in a highly consistent manner. The CLI of the workflow tool enables this consistency.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of provisioning an externally mutable uniform resource locator (URL) to application deployments on one or more cloud computing platforms, the method comprising:

generating, by a discovery and routing service of a cloud provisioning platform, a URL related to an application to be deployed to at least one of the one or more cloud computing platforms, the URL being configured to provide access to an edge list that represents one or more edge nodes;

connecting, by the discovery and routing service, at least one agent to the URL, each agent being configured to connect with the one or more edge nodes in the edge list via the URL;

sending, by the discovery and routing service, authentication information to the agent, the authentication information including an identifier related to the agent, and a set of agent labels to identify traffic between the agent each of the one or more edge nodes;

inserting, after authentication by the edge node, the authentication information into a routing mesh, the routing mesh being configured to receive a request that includes a set of request labels, the request being configured to send data traffic to the agent;

upon receiving a request by the routing mesh, locating, by the discovery and routing service, the agent based on a comparison between the set of request labels and a set of agent labels; and connecting, by the discovery and routing service, the located agent with traffic to and from the routing mesh.

2. The method in accordance with claim 1, further comprising:

terminating, by the discovery and routing service, the traffic to and from the routing mesh and the located agent based on receipt of a Transport Layer Security (TLS) request.

3. The method in accordance with claim 2, wherein the terminating further includes sending a request to terminate traffic to the agent, the request including connection information that allows the agent to transmit a response to the request.

4. The method in accordance with claim 1, wherein the set of request labels and the set of agent labels are order independent.

5. The method in accordance with claim 1, wherein the agent is located, by the discovery and routing service, if each label in the set of request labels matches each label in the set of agent labels.

6. The method in accordance with claim 1, further comprising:

sending application configuration information, by a custom entry point binary, to the discovery and routing service wherein the discovery and routing service selects a configuration based on the application configuration information.

7. The method according to claim 1, wherein the at least one of the one or more edge nodes has a public address and is directly addressable.

8. A non-transitory computer-readable medium storing a set of instructions, the set of instructions comprising:

one or more instructions that, when executed by one or more processors of an electronic device, cause the device to:

generate, by a discovery and routing service of a cloud provisioning platform, a URL related to an application to be deployed to at least one of the one or more cloud computing platforms, the URL being configured to provide access to an edge list that represents one or more edge nodes;

connect, by the discovery and routing service, at least one agent to the URL, each agent being configured to connect with the one or more edge nodes in the edge list via the URL;

send, by the discovery and routing service, authentication information to the agent, the authentication information including an identifier related to the agent, and a set of agent labels to identify traffic between the agent each of the one or more edge nodes;

send, after authentication by the edge node, the authentication information to a routing mesh, the routing mesh being configured to insert the authentication information into the routing mesh and receive a request that includes a set of request labels, the request being configured to send data traffic to the agent;

upon receiving a request by the routing mesh, locating, by the discovery and routing service, the agent based on a comparison between the set of request labels and a set of agent labels; and connect, by the discovery and routing service, the located agent with traffic to and from the routing mesh.

9. The non-transitory computer-readable medium of claim 8, wherein the one or more instructions further cause the discovery and routing service to: terminate, by the discovery and routing service, the traffic to and from the routing mesh and the located agent based on receipt of a Transport Layer Security (TLS) request.

10. The non-transitory computer-readable medium of claim 9, wherein the terminating further includes sending a request to terminate traffic to the agent, the request including connection information that allows the agent to transmit a response to the request.

11. The non-transitory computer-readable medium of claim 8, wherein the set of request labels and the set of agent labels are order independent.

12. The non-transitory computer-readable medium of claim 8, wherein the agent is located if each label in the set of request labels matches each label in the set of agent labels.

13. The non-transitory computer-readable medium of claim 8, further comprising: sending configuration information, by a custom entry point binary, to the discovery and routing service wherein the discovery and routing service selects a configuration based on the configuration information.

14. The non-transitory computer-readable medium of claim 8, wherein the at least one of the one or more edge nodes has a public address and is directly addressable.

15. An electronic device, comprising:

one or more memories; and one or more processors, communicatively coupled to the one or more memories, configured to:

generate, by a discovery and routing service of a cloud provisioning platform, a URL related to an application to be deployed to at least one of the one or more cloud computing platforms, the URL being configured to provide access to an edge list that represents one or more edge nodes;

connect, by the discovery and routing service, at least one agent to the URL, each agent being configured to connect with the one or more edge nodes in the edge list via the URL;

send, by the discovery and routing service, authentication information to the agent, the authentication information including an identifier related to the agent, and a set of agent labels to identify traffic between the agent each of the one or more edge nodes;

insert, after authentication by the edge node, the authentication information into a routing mesh, the routing mesh being configured to receive a request that includes a set of request labels, the request being configured to send data traffic to the agent;

upon receiving a request by the routing mesh, locating, by the discovery and routing service, the agent based on a comparison between the set of request labels and a set of agent labels; and connect, by the discovery and routing service, the located agent with traffic to and from the routing mesh.

16. The electronic device of claim 15, wherein the one or more processors are further configured to:
    terminate, by the discovery and routing service, the traffic to and from the routing mesh and the located agent based on receipt of a Transport Layer Security (TLS) request.

17. The electronic device of claim 16, wherein the terminating further includes sending a request to terminate traffic to the agent, the request including connection information that allows the agent to transmit a response to the request.

18. The electronic device of claim 15, wherein the set of request labels and the set of agent labels are order independent.

19. The electronic device of claim 15, wherein the agent is located, by the discovery and routing service, if each label in the set of request labels matches each label in the set of agent labels.

20. The electronic device of claim 15, wherein the one or more processors are further configured to:
    send application configuration information to the discovery and routing service wherein the discover and routing service selects a configuration based on the application configuration information.

* * * * *